United States Patent [19]
Marsland

[11] Patent Number: 6,047,124
[45] Date of Patent: Apr. 4, 2000

[54] SYSTEM AND METHOD FOR TRACING DEVICE DRIVERS USING A COMPUTER

[75] Inventor: Timothy P. Marsland, Half Moon Bay, Calif.

[73] Assignee: Sun Microsystems, Inc., Palo Alto, Calif.

[21] Appl. No.: 08/962,532

[22] Filed: Oct. 31, 1997

[51] Int. Cl.[7] .................................................. G06F 9/45
[52] U.S. Cl. ........................................................ 395/704
[58] Field of Search .......................... 395/704; 709/224, 709/301, 300; 710/15

[56] References Cited

U.S. PATENT DOCUMENTS

| | | | |
|---|---|---|---|
| 5,404,494 | 4/1995 | Garvey | 395/500 |
| 5,459,867 | 10/1995 | Adams | 395/681 |
| 5,463,775 | 10/1995 | DeWitt | 702/186 |
| 5,519,833 | 5/1996 | Agranat | 395/200.61 |
| 5,613,123 | 3/1997 | Tsang | 709/301 |
| 5,701,486 | 12/1997 | Gilbertson | 395/704 |
| 5,778,226 | 7/1998 | Adams | 395/681 |
| 5,796,988 | 8/1998 | Naidu | 395/500 |
| 5,867,710 | 2/1999 | Dorris | 395/704 |
| 5,884,081 | 3/1999 | Burceck | 395/704 |
| 5,884,082 | 3/1999 | Seidel et al. | 395/704 |
| 5,889,988 | 3/1999 | Held | 709/103 |
| 5,894,575 | 4/1999 | Levine et al. | 395/704 |
| 5,896,536 | 4/1999 | Lindsey | 395/704 |
| 5,898,873 | 4/1999 | Lehr | 395/704 |
| 5,899,993 | 3/1999 | Kroeger et al. | 395/704 |
| 5,903,758 | 5/1999 | Walker | 395/704 |
| 5,905,890 | 5/1999 | Seaman et al. | 395/704 |
| 5,933,640 | 8/1999 | Dion | 395/704 |
| 5,943,498 | 8/1999 | Yano et al. | 395/704 |
| 5,946,486 | 8/1999 | Pekowski | 395/704 |

OTHER PUBLICATIONS

Samuel J. Leffler, The Design and Implementation of the 4.3BSD UNIX Operating System, pp. 37, 49, 169–71, 225–56, May 1989.

Maurice J. Bach, The Design of the UNIX Operating System, pp. 20–21, 312–24, 1986.

Digital Equipment Corporation, Guide to Writing a Device Driver for VAX/VMS, pp. 15–1 to 15–28, Sep. 1984.

Sun Microsystems, Inc., "SunOS Reference Manual", pp. 1M–790 to 1M–801, 1–1043, 1–1044, 1–1046, 1997.

Sun Microsystems, Inc., "Writing Device Drivers", 1997.

Bryan Ford, The Flux OSKit: A Substrate for Kernel and Language Research, 31 ACM SIGOPS Operating Systems Review 38–51, Oct. 1997.

F. Mueller et al., MiThOS—A Real Time Micro–Kernel Threads Operating System, 95 Proceedings of the 16th IEEE Real–Time Systems Symposium 49–53, Dec. 1995.

Jochen Liedtke, Improving [Interprocess Communication] IPC by Kernel Design, 27 ACM SIGOPS Operating Systems Review 175–88, Dec. 1993.

*Primary Examiner*—Tariq R. Hafiz
*Assistant Examiner*—Michael Pender
*Attorney, Agent, or Firm*—Sabath & Truong; Bobby K. Truong

[57] ABSTRACT

A system and method for tracing device drivers using a computer is described. A memory is interconnected with a processor in the computer and configured into a user memory space and a kernel memory space. An application process executes on the processor within the user memory space. An operating system kernel executes on the processor within the kernel memory space with a traced device driver. A tracing device driver executes on the processor within the kernel memory space and is interposed between the application process and the traced device driver to trace interactions occurring between the traced device driver and the application process and the kernel operating system. A tracing process executes on the processor within the user memory space and interfaces with the tracing device driver. The tracing process controls the tracing device driver in accordance with user-specified parameters and includes a display for result sets generated by the tracing device driver.

22 Claims, 6 Drawing Sheets

SYSTEM AND METHOD FOR TRACING DEVICE DRIVERS USING A COMPUTER

FIELD OF THE INVENTION

The present invention relates in general to computer software device drivers and, in particular, to a system and method for tracing device drivers using a computer.

BACKGROUND OF THE INVENTION

Device drivers are kernel modules embedded within an operating system kernel for controlling data transferred to and received from peripheral hardware devices. Some types of device drivers also perform resource allocation as a result of an I/O or configuration operation, such as kernel memory mappings, direct memory access (DMA) mapping of resources and interrupt line and vector allocations. The device drivers, unlike user applications, are usually situated beneath layers of other software, such as network protocol stacks and filesystems. The kernel interfaces with peripheral devices, such as file storage, graphical display and communication devices, via its device drivers. The technique employed by the kernel to interface with a particular device is device-dependent and each different type of device generally requires its own specific device driver.

Debugging and tracing the performance and operation of device drivers is problematic for several reasons. First, debugging kernel code, including device drivers, is more difficult than debugging user-level application code. The device drivers operate without the protection of the operating system and function much closer to the hardware than the application code. Second, device driver bugs can prove catastrophic. For instance, a stray pointer access can crash the entire system. Third, device drivers are relatively inaccessible. Device driver interfaces are within the kernel memory space and are not directly accessible by application programs. Moreover, some device driver functions can only be invoked via other device drivers, thereby making debugging via application programs impractical. Finally, efforts to debug and trace device drivers can adversely affect the operation and timing of the kernel. For instance, overly intrusive instrumentation can change the dynamics of the system and nullify the meaningfulness of the test results.

One approach to tracing device drivers under the Solaris™ operating system, a version of UNIX®, uses the truss user command, such as described in the "SunOS Reference Manual," pp. 1-1043 to 1-1044, 1044; 1-1046 Sun Microsystems, Inc. (1997), the disclosure of which is incorporated herein by reference. The truss command traces system calls and signals by executing a specified command and tracing the system calls performed, signals received and machine faults incurred. However, the truss command is limited to tracing system call interactions occurring across the user and kernel memory space boundary and cannot trace inter-device driver calls. Solaris™ is a trademark of Sun Microsystems, Inc., Mountain View, Calif. UNIX® is a registered trademark of The Santa Cruz Operation, Santa Cruz, Calif.

Another approach to tracing device drivers under the Solaris™ operating system uses the snoop system administration command, such as described in the "SunOS Reference Manual," pp. 1M -790 to 1M-801, cited hereinabove, the disclosure of which is incorporated herein by reference. The snoop command possesses a built-in layering mechanism which captures packets from the network and displays their contents using both a network packet filter and streams buffer modules to capture packets from the network. However, the snoop command is limited to observing protocol transactions on a particular network or device by tracing network packets and cannot trace interactions for specific device drivers.

Therefore, there is a need for a system and method for tracing and debugging device drivers that is aware of device driver semantics. Such a system and method would observe incoming and outgoing system calls, identify the applications using device drivers, time stamp events and track resource allocation and usage within the device driver.

SUMMARY OF THE INVENTION

The present invention enables the above problems to be substantially overcome by providing a system and method for tracing device drivers using a computer.

An embodiment of the present invention is a system and method for tracing device drivers using a computer. A memory is interconnected with a processor in the computer and configured into a user memory space and a kernel memory space. An application process executes on the processor within the user memory space. An operating system kernel executes on the processor within the kernel memory space with a traced device driver. A tracing device driver executes on the processor within the kernel memory space and is interposed between the application process and the traced device driver to trace interactions occurring between the traced device driver and the application process and the operating system kernel. A tracing process executes on the processor within the user memory space and interfaces with the tracing device driver. The tracing process controls the tracing device driver in accordance with user-specified parameters and includes a display for result sets generated by the tracing device driver.

Still other embodiments of the present invention will become readily apparent to those skilled in the art from the following detailed description, wherein is shown and described only the embodiments of the invention by way of illustration of the best modes contemplated for carying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

DETAILED DESCRIPTION

I. System for Tracing Device Drivers

Figure 1:
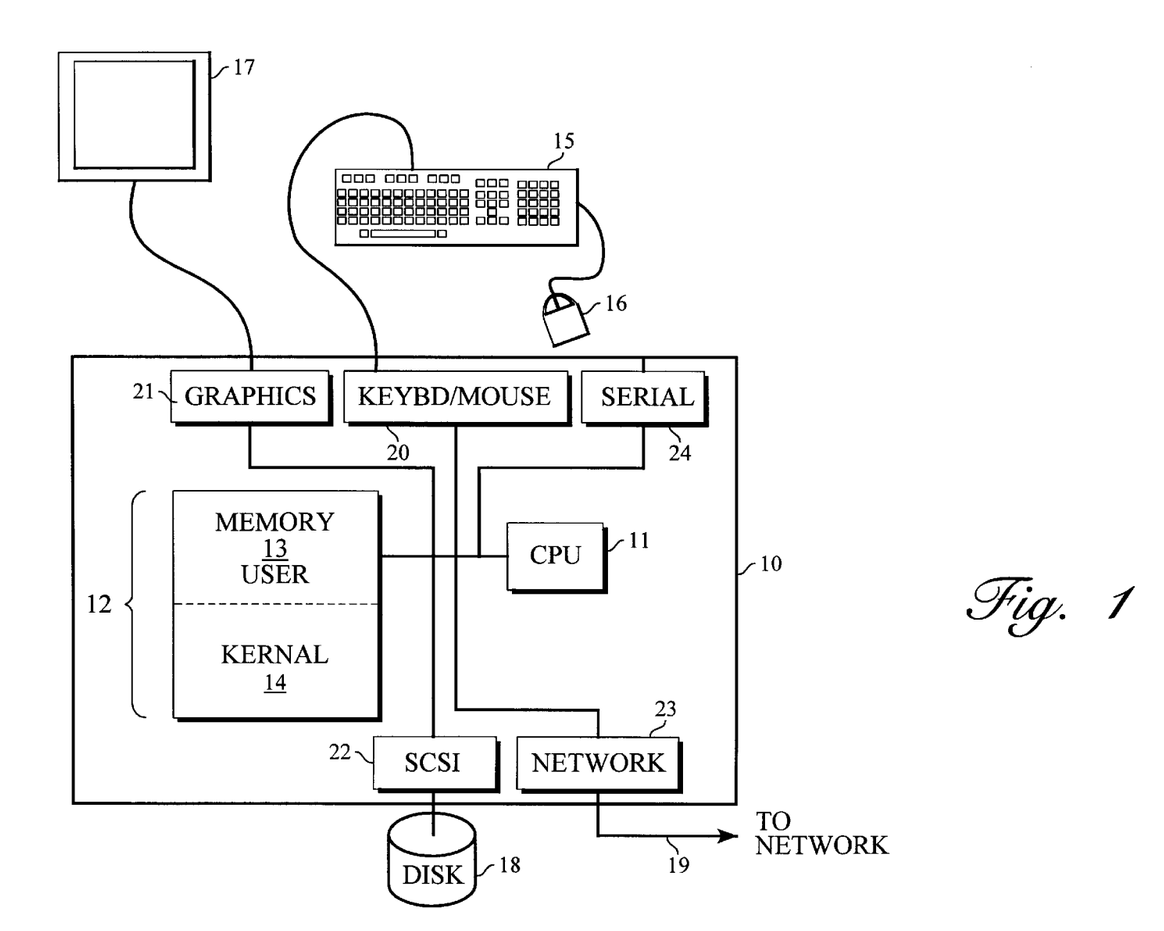
FIG. 1 is a block diagram of a system for tracing device drivers according to the present invention.

FIG. 1 is a block diagram of a system 10 for tracing device drivers according to the present invention. The system 10 is a conventional programmed digital computer, including a central processing unit (CPU) 11 interconnected with a main memory 12. The system 10 includes peripheral user interfacing devices, including monitor 17, keyboard 15 and mouse 16 and a disk storage device 18. The individual components implementing the system 10 are internally interconnected over a central system bus used for exchanging address, data and control signals, although other forms of component interconnections are possible. The system 10 can include peripheral devices for accepting computer-readable storage mediums (not shown) and can be interconnected with a network 19 for exchanging data and control signals transmitted as a computer data signal in a carrier wave.

At a hardware level, each peripheral device interfaces with the system 10 via an interface module interconnected over the central system bus with the CPU 11. The kernel interfaces with each interface module via a device driver. The monitor 17 interfaces via a graphics module 21. The keyboard 15 and mouse 16 interface via a keyboard/mouse module 20. The disk storage system 18 (disk) interfaces via a small computer systems interconnection (SCSI) module 22. The system 10 interconnects with the network 19 via a network module 23. Other equivalent forms of modules for interfacing the system 10 with various types of peripheral devices are possible. In addition, other interconnections are possible, including interfacing the system 10 with a serial device (not shown) via a serial module 24.

The memory 12 is logically organized into user memory space 13 and kernel memory space 14. The user memory space 13 is used by application programs and user-executed system commands. The kernel memory space 14 is used by the operating system for both the kernel and device drivers. At runtime, the programs and commands interface with the kernel through system calls which instruct the kernel to perform various operations and exchange data between the kernel and calling function. Device drivers, further described herein below with reference to FIG. 2, are embedded within the kernel memory space 14.

In the described embodiment, the system 10 is a networkable computer, such as a Sun SPARCstation™ 5 workstation running Solaris™, a version of the UNIX® operating system, or an IBM-compatible computer running Windows NT™. However, use of the systems and methods described and suggested herein are not limited to a particular computer configuration or operating system. SPARCstation™ and Solaris™ are trademarks of Sun Microsystems, Inc., Mountain View, Calif. UNIX® is a registered trademark of The Santa Cruz Operation, Santa Cruz, Calif. Windows NT™ is a trademark of Microsoft Corporation, Redmond, Wash.

Figure 2:
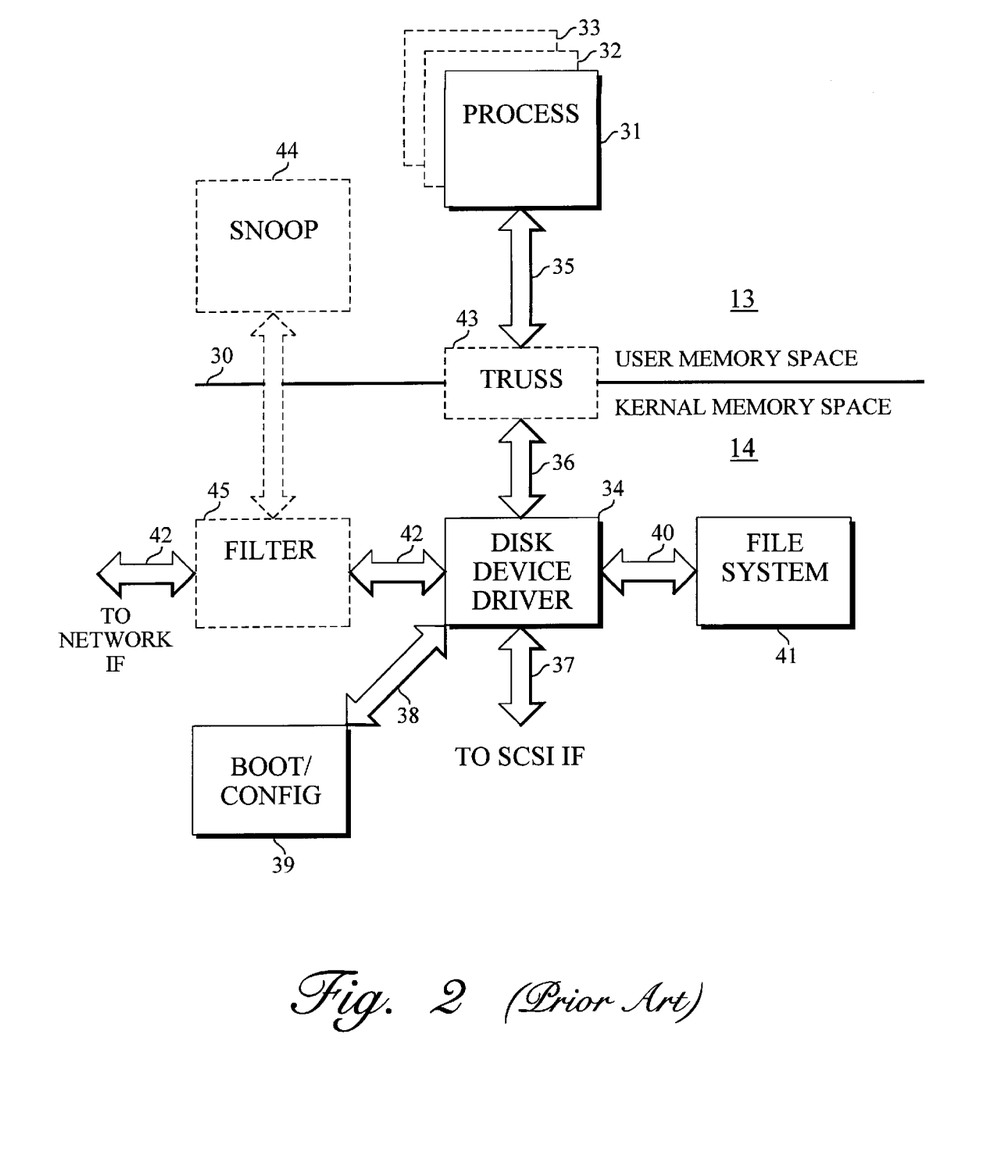
FIG. 2 is a functional block diagram of prior art methods for tracing device drivers loaded into the memory of the system of FIG. 1.

FIG. 2 is a functional block diagram of prior art methods for tracing device drivers loaded into the memory 12 of the system 10 of FIG. 1. A plurality of application processes 31, 32, 33 execute in the user memory space 13 and interface with a disk device driver 34 (disk driver) executing in the kernel memory space 14. The disk driver 34 is described as an example of a device driver because it interfaces with other processes in the user memory space 13 and the kernel memory space 14 and the underlying disk 18 via the SCSI module 22 (shown in FIG. 1). However, some device drivers are pseudo device drivers (not shown) which are not associated with any particular underlying hardware. Generally, pseudo device drivers are character devices, described below, such as "/dev/null" and "/dev/zero." Since there is no underlying hardware, there is no resulting consumption of hardware resources as a result of executing the driver.

By way of example, in the described embodiment, device drivers function as either character, block or STREAMS devices. Character devices can effect single character or larger data transfers. Block devices, such as disk driver 34, effect transfers of blocks of data by rounding up to a whole number of blocks from the actual size requested. For example, a read() request for ten bytes of data would result in disk driver 34 reading in a 512 byte block of data. Disk drivers are described further in "Writing Device Drivers," Sun Microsystems, Inc. (1997), the disclosure of which is incorporated herein by reference.

The disk driver 34 controls requests to and receives data from the disk 18 (shown in FIG. 1) via the SCSI interface (IF) module 22 (shown in FIG. 1). The disk driver 34 receives requests from application processes 31, 32, 33, peer device drivers (not shown) and other kernel processes, such as file system process 41. For purposes of simplification, only application process 31 will be discussed, although the concepts conveyed herein can apply equally to multiple processes.

The receipt of a request initiates the occurrence of an event. Table 1, shown below, lists by way of example device driver requests.

TABLE 1

Device Driver Requests.

| Request Name | Description |
| --- | --- |
| open | Open device driver for access. |
| close | Close device driver. |
| ioctl | Configure device driver I/O parameters. |
| read | Read data from device driver. |
| write | Write data to device driver. |
| strategy | Performs asynchronous block read/write operations to support file system read and write operations. |
| prop_op | Allows the system to enquire about various driver attributes, such as the number of disk blocks on a disk device. |
| devmap | Allows applications to map device memory into their address space. |

By way of example, the disk driver 34 exports three service interfaces: driver-kernel; driver-hardware; and driver-boot/configuration. System calls 35 made by process 31 result in driver entry point routine calls 36. Likewise, inter-kernel function calls 40 made by peer device drivers and kernel processes, such as file system 41, result in additional driver entry point routine calls 40. The set of driver entry point routines 36, 40 for a given device driver make up the kernel-to-driver part of the driver-kernel interface.

The disk driver 34 can itself call kernel routines, such as function calls 42 requesting services from the network interface 23 (shown in FIG. 1). The set of kernel routines for a given device driver make up the driver-to-kernel part of the driver-kernel interface. All device drivers, except software device drivers, include code for interrupt handling and, if appropriate, performing DMA, such as for interfacing with the SCSI interface 22 (shown in FIG. 1). These sets of code and other hardware-specific interactions for a given device driver make up the driver-hardware interface.

Finally, the driver-boot/configuration interface is made up of the set of function calls 42 made by the boot/configuration process 39 during system boot up and whenever the disk driver 34 requires configuration. Device driver requests, entry points, functions and structures are described generally in "SunOS Reference Manual," §§ 9, 9E, 9F, 9S, Sun Microsystems, Inc. (1997), the disclosure of which is incorporated herein by reference.

One prior art approach to tracing and debugging device drivers uses a system call, called truss 43, for monitoring the system call interface 30 between the user memory space 13 and the kernel memory space 14. The truss process 43 intercepts both system calls 35 and the returned values from the kernel. However, the truss process 43 is limited to interactions strictly occurring between the user memory space 13 and kernel memory 14. The truss process 43 cannot trace interactions occurring over the three service interfaces of the disk driver 34 and specifically cannot monitor driver entry point routine calls 36 nor inter-kernel function calls 40.

Another prior art approach to tracing and debugging device drivers uses an application process, called snoop 44, for monitoring network requests and packet traffic. The snoop process 44 pushes a filter module 45 onto a STREAM 42 to allow the network packets that pass by to be interpreted and monitored by users. It attempts to decode the data strictly from the point of view of understanding the status of the network 19 and cannot trace interactions occurring over the three service interfaces of the disk driver 34 for purposes of understanding the device drivers.

Figure 3:
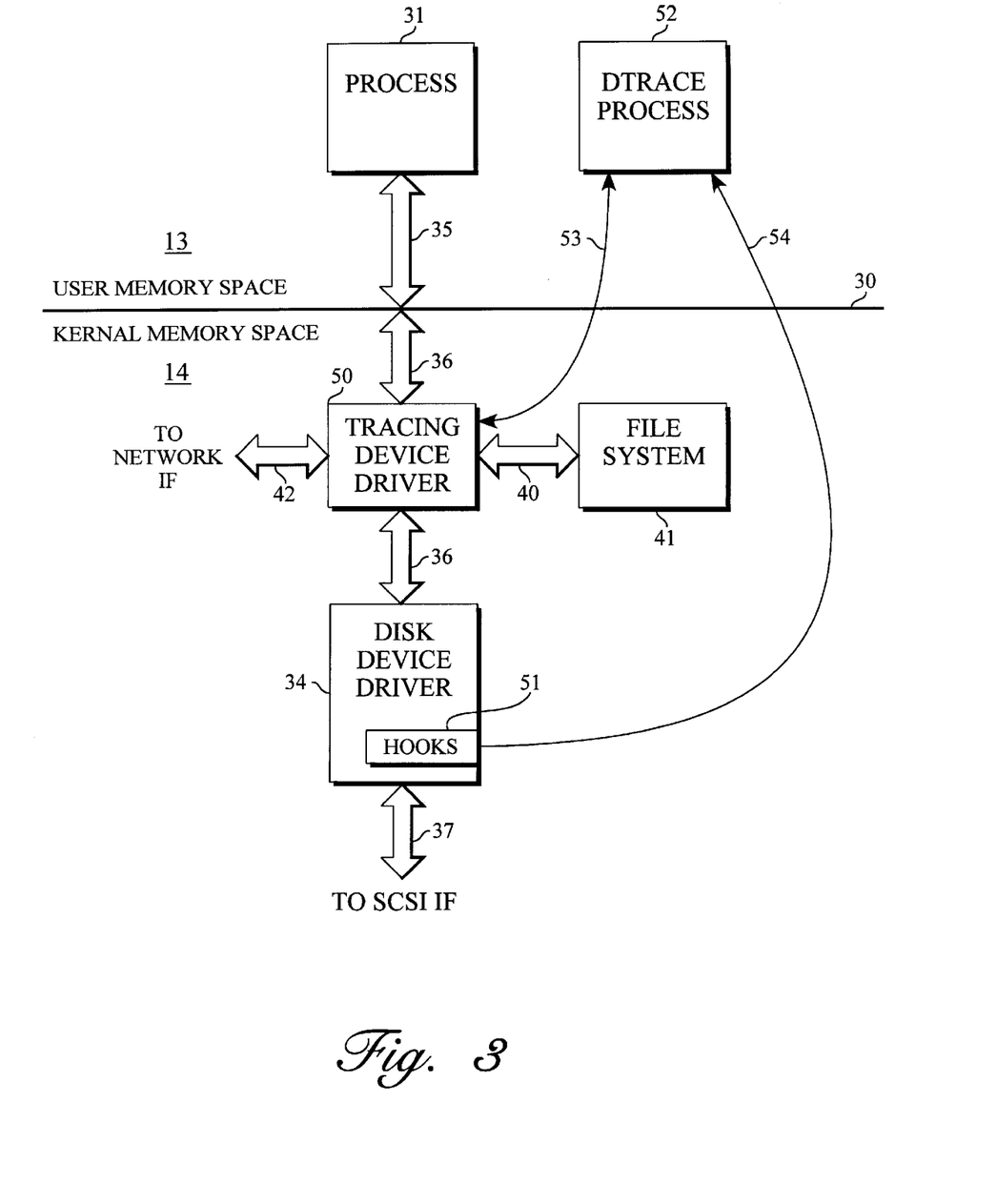
FIG. 3 is a functional block diagram of components used for tracing device drivers according to the present invention loaded into the memory of the system of FIG. 1.

FIG. 3 is a functional block diagram of the components used for tracing device drivers according to the present invention loaded into the memory 12 of the system 10 of FIG. 1. Three components are used for tracing device drivers: tracing device driver 50 (tracing driver); hooks 51; and dtrace process 52. The dtrace process 52 controls the tracing of device driver events. It allows the device driver to be traced, such as disk driver 34, to be selected and configured with various parameters 53, such as the number and types of events to be monitored. The tracing driver 50 is a layered device driver interposed on an existing device driver for recording transactions performed by the kernel on that device driver and forwarding requests onto the underlying device driver in an untranslated form. The hooks 51 allow the tracing driver 50 to record resource consumption 54 caused by particular driver transactions. The hooks 51 are introduced in the underlying resource allocators provided by the device driver implementation (DDI).

Operationally, the tracing driver 50 enables a user to specify which device drivers and what events are to be traced. During subsequent processing, the kernel records the traced events for later capture and dissemination to other user processes 31, 32, 33. Events, such as listed above in Table 1, can be captured by the tracing driver 50. In addition, DMA, mapping and other resources consumed by the driver can be described and monitored via the hooks 51. Moreover, the tracing driver 50 allows the originator of the request to be identified, including a specific user, process, thread or a request pertaining to a specific logical device provided by that driver.

II. Method for Tracing Device Drivers

Figure 4:
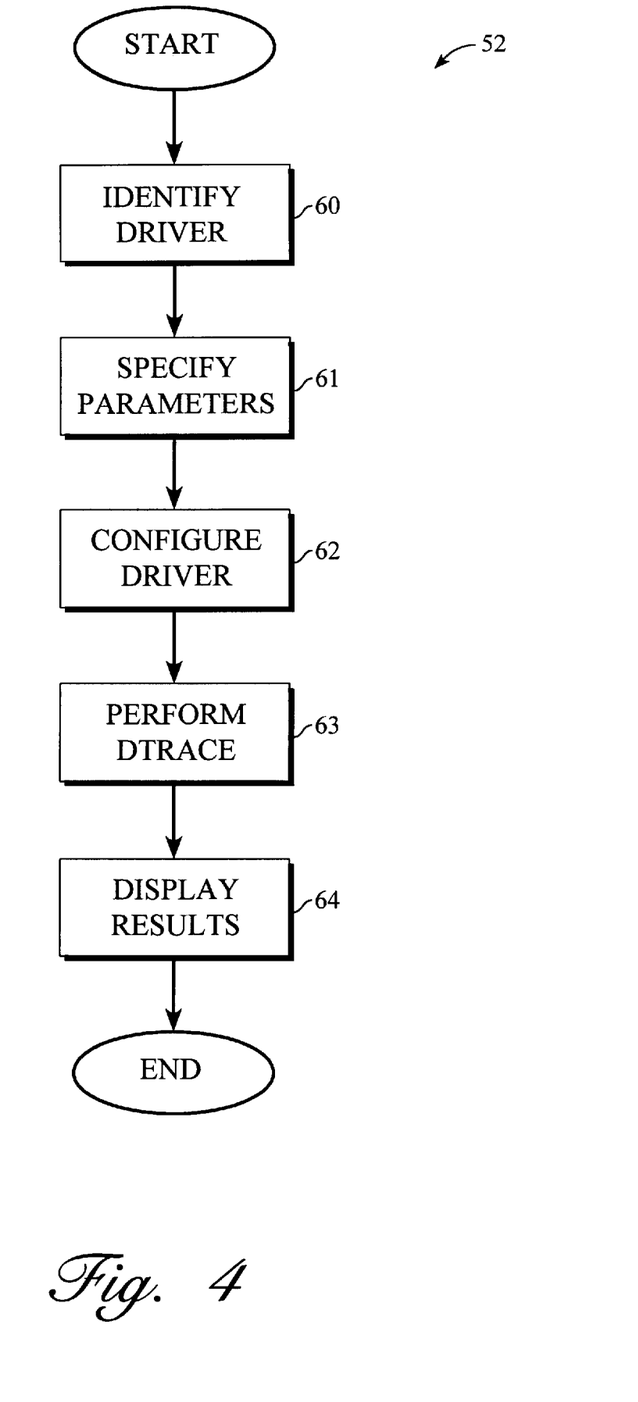
FIG. 4 is a flow diagram of a method for tracing device drivers according to the present invention.

FIG. 4 is a flow diagram of a method for tracing device drivers according to the present invention. The method is illustrated and described as a series of method steps. As would be clear to one skilled in the art, the method steps can be embodied as code for a computer program for operation on a conventional programmed digital computer, such as system 10 (shown in FIG. 1). The program code can be embodied as a computer program on a computer-readable storage medium or as a computer data signal in a carrier wave transmitted over network 19.

At the highest level, the method initializes the environment, traces the device driver and displays the results. First, the device driver under test is identified (block 60). Using the dtrace process 52 (shown in FIG. 3), the parameters to be measured are specified (block 61) and the driver is configured (block 62). The device is then traced by performing the dtrace process 52 (block 63) as further described herein below with reference to FIG. 5. Finally, the results from the trace are displayed (block 64).

Figure 5:
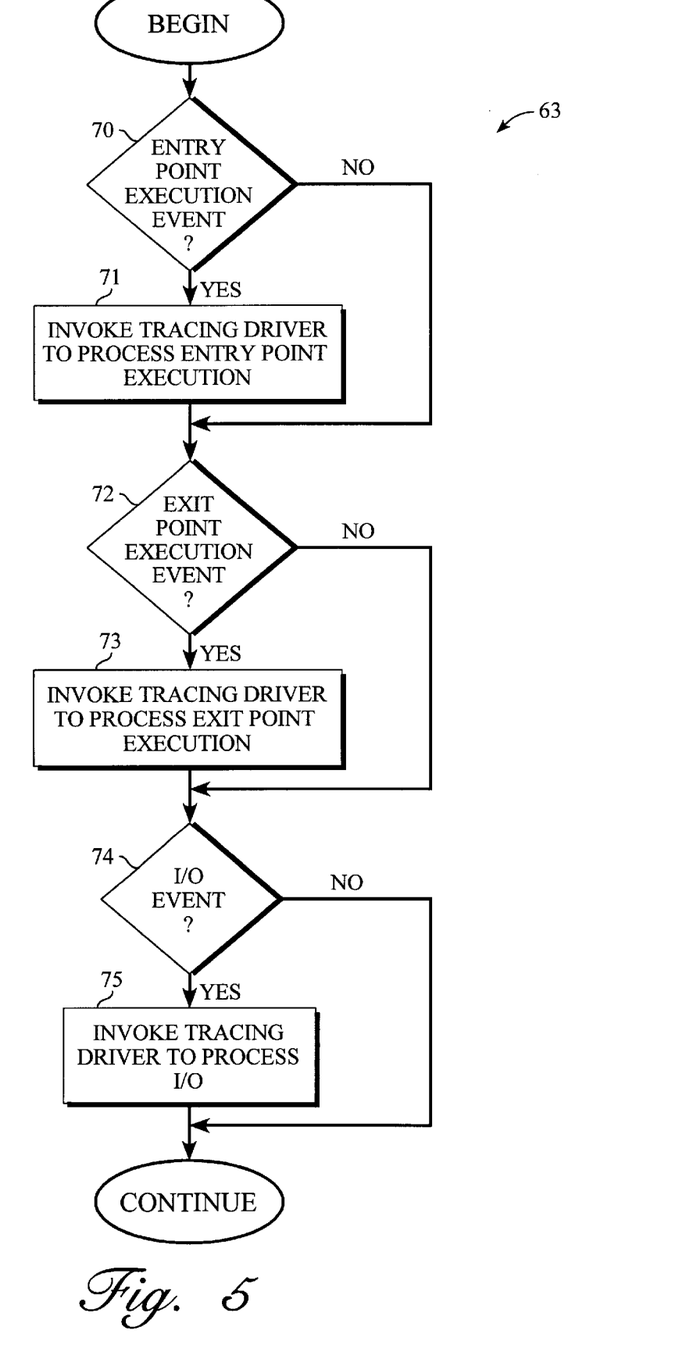
FIG. 5 is a flow diagram of a routine for performing a driver trace used by the method of FIG. 4.

FIG. 5 is a flow diagram of the routine for performing a driver trace 63 with the dtrace process 52 used by the method of FIG. 4. By way of example, the routine identifies and processes three types of events, although additional events could also be traced. Thus, if an entry point execution event is identified (block 70), the entry point execution is processed (block 71) as further described herein below with reference to FIG. 6. Similarly, if an exit point execution event is identified (block 72), the exit point execution is processed (block 73) as further described herein below with reference to FIG. 6. Finally, if an I/O event is identified (block 74), the I/O event is processed (block 75) as further described herein below with reference to FIG. 6.

Event types are driver dependent and the types of data that needs to be traced varies accordingly. For instance, an audio driver generates raw data and is typically called directly by the application process. The tracing driver 50 needs to selectively trace the raw data since the audio driver operates in near real time. A frame buffer driver maps a section of device memory into the user address space in response to a page fault. A user process generates a page fault by attempting to access device memory. The page fault is resolved by the kernel by calling the driver entry point to obtain the physical address of the driver memory. The tracing driver 50 and hooks 51 need to identify the occurrence of the page fault which would otherwise remain hidden from the application process. Finally, a communications driver is managed by the STREAMS protocol stack and is an untyped interface generating raw data. The tracing driver 50 needs to interface to the STREAMS processes, virtual memory manager, I/O manager and signals processes.

Figure 6:
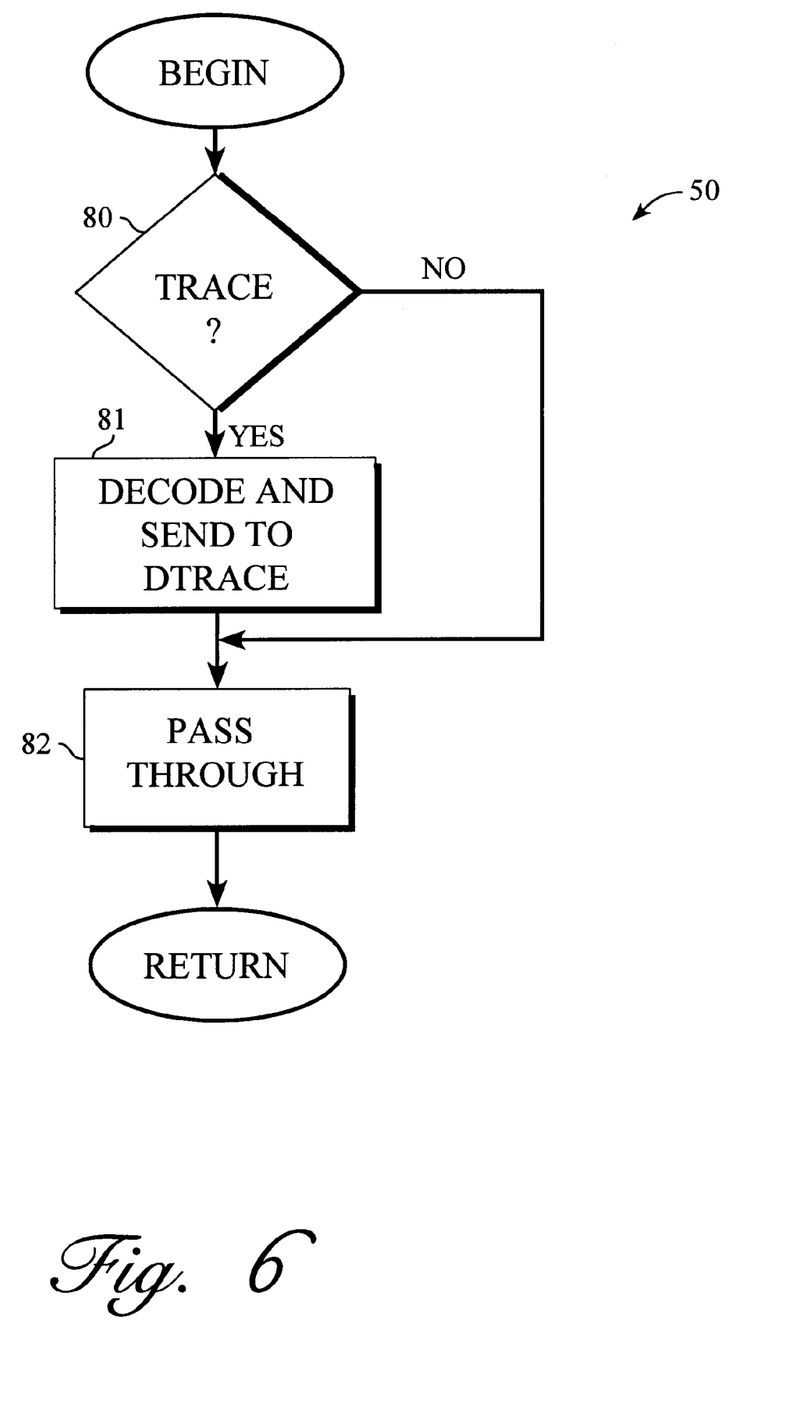
FIG. 6 is a flow diagram of a routine for processing a device driver event used by the routine of FIG. 5.

FIG. 6 is a flow diagram of the routine for processing a device driver event 71, 73, 75 used by the routine of FIG. 5. The routine is described in a generic fashion applicable to a variety of events, but could be replaced by a more specific routine if the nature of the event being traced so required. If the parameters for the device driver indicate the particular event is being traced (block 80), the tracing driver 50 decodes the event and the hooks 51 send the resource consumption values, if any, to the dtrace process 52 (block 81). Finally, the event is passed through to the device driver under test (block 82).

While the invention has been particularly shown and described with reference to embodiments thereof, those skilled in the art will understand that the foregoing and other changes in form and detail may be made therein without departing from the spirit and scope of the present invention.

I claim:

1. A system for tracing device drivers using a computer, comprising:

a memory interconnected with a processor in the computer and configured into a user memory space and a kernel memory space;

an application process executing on the processor within the user memory space;

a kernel operating system executing on the processor within the kernel memory space with a traced device driver;

a tracing device driver executing on the processor within the kernel memory space and interposed between the application process and the traced device driver to trace interactions occurring between the traced device driver and the application process and the kernel operating system; and a tracing process executing on the processor within the user memory space and interfacing with the tracing device driver, the tracing process controlling the tracing device driver in accordance with user-specified parameters.

2. A system according to claim 1, wherein the traced device driver interfaces the kernel operating system to at least one peripheral hardware device interfaced with the computer, the tracing device driver further tracing interactions occurring between the traced device driver and at least one peripheral hardware device.

3. A system according to claim 1, wherein the tracing device driver further comprises an event occurrence determination unit configured to:
   intercept an event generated and sent by the application process intended for the traced device driver;
   intercept responses generated and sent by the traced device driver intended for the application process in response to the event; and
   process the event occurrence into one or more results.

4. A system according to claim 3, wherein the tracing device driver further comprises an event decoder configured to determine whether the event is being traced, decode the event when the event is being traced and pass the event through to the traced device driver.

5. A system according to claim 1, wherein the traced device driver further comprises hooks configured to monitor resource allocation and consumption within the traced device driver and interface with the tracing process.

6. A system according to claim 1, wherein the traced device driver further comprises a driver-kernel interface including a set of driver entry point routines and a set of kernel routines, the tracing device driver configured to trace each such driver entry point routine and each such kernel routine.

7. A system according to claim 1, wherein the traced device driver further comprises a driver-hardware interface including code for interrupt handling and hardware-specific interactions, the tracing device driver configured to trace the code for interrupt handling and hardware-specific interactions.

8. A system according to claim 1, wherein the system further comprises a boot/configuration process executing on the processor within the kernel memory space and the traced device driver further comprises a driver-boot/configuration interface interfacing the traced device driver with the boot/configuration process, the tracing device driver configured to trace the interactions between the traced device driver and the boot/configuration process.

9. A method for tracing device drivers using a computer, the computer including a memory configured into a user memory space and a kernel memory space, comprising the steps of:
   executing an application process within a user memory space;
   executing an operating system kernel within a kernel memory space with a traced device driver;
   executing a tracing process within the user memory space, the tracing process identifying the traced device driver;
   executing a tracing device driver within the kernel memory space and interposed between the application process and the traced device driver; and
   performing a driver trace with the tracing device driver to trace interactions occurring between the traced device driver and the application process and the kernel operating system and interfacing the tracing device driver with the tracing process, the tracing process controlling the tracing device driver in accordance with user-specified parameters.

10. A method according to claim 9, further comprising the step of interfacing the kernel operating system to at least one peripheral hardware device interfaced with the computer, the step of performing a driver trace further comprising the step of tracing interactions occurring between the traced device driver and at least one peripheral hardware device.

11. A method according to claim 9, wherein the step of performing a driver trace further comprises the steps of:
   determining an occurrence of an event by intercepting an event generated and sent by the application process intended for the traced device driver and intercepting responses generated and sent by the traced device driver intended for the application process in response to the event; and
   processing the event occurrence into one or more results.

12. A method according to claim 11, wherein the event is at least one of an entry point execution event, an exit point execution event and an I/O event.

13. A method according to claim 11, wherein the step of processing the event further comprises the steps of:
   determining whether the event is being traced;
   decoding the event when the event is being traced; and
   passing the event through to the traced device driver.

14. A method according to claim 9, further comprising the steps of:
   executing hooks in the traced device driver to monitor resource allocation and consumption within the traced device driver;
   recording the resource allocation and consumption using the hooks; and
   sending the recorded resource allocation and consumption to the tracing process.

15. A method according to claim 11, wherein the traced device driver further comprises a driver-kernel interface including a set of driver entry point routines and a set of kernel routines, the step of determining the occurrence of an event further comprising the step of monitoring the driver-kernel interface by tracing each such driver entry point routine and each such kernel routine.

16. A method according to claim 11, wherein the traced device driver further comprises a driver-hardware interface including code for interrupt handling and hardware-specific interactions, the step of determining the occurrence of an event further comprising the step of monitoring the driver-hardware interface by tracing the code for interrupt handling and hardware-specific interactions.

17. A method according to claim 11, further comprising the steps of:
   executing a boot/configuration process within the kernel memory space, the traced device driver fuirther comprises a driver-boot/configuration interface interfacing the traced device driver with the boot/configuration process, the step of determining the occurrence of an event further comprises the step of monitoring the driver-boot/configuration interface by tracing the interactions between the traced device driver and the boot/configuration process.

18. A computer-readable storage medium embodying computer code for tracing device drivers using a computer, the computer including a memory configured into a user memory space and a kernel memory space, comprising:
   code for executing an application process within a user memory space;
   code for executing an operating system kernel within a kernel memory space with a traced device driver interfacing the kernel operating system to at least one peripheral hardware device interfaced with the computer;

code for executing a tracing process within the user memory space, the tracing process identifying the traced device driver;

code for executing a tracing device driver within the kernel memory space and interposed between the application process and the traced device driver; and code for performing a driver trace with the tracing device driver to trace interactions occurring between the traced device driver and the application process, the kernel operating system and at least one peripheral hardware device and interfacing the tracing device driver with the tracing process, the tracing process controlling the tracing device driver in accordance with user-specified parameters.

19. A computer-readable storage medium according to claim 18, wherein the code for performing a driver trace firther comprises:

code for determining an occurrence of an event by intercepting an event generated and sent by the application process intended for the traced device driver and intercepting responses generated and sent by the traced device driver intended for the application process in response to the event; and code for processing the event occurrence into one or more results.

20. A computer-readable storage medium according to claim 19, wherein the event is at least one of an entry point execution event, an exit point execution event and an I/O event.

21. A computer-readable storage medium according to claim 19, wherein the code for processing the event further comprises:

code for determining whether the event is being traced;

code for decoding the event when the event is being traced; and code for passing the event through to the traced device driver.

22. A computer-readable storage medium according to claim 18, further comprising:

code for executing hooks in the traced device driver to monitor resource allocation and consumption within the traced device driver;

code for recording the resource allocation and consumption using the hooks; and code for sending the recorded resource allocation and consumption to the tracing process.

* * * * *